Patented Mar. 7, 1939

2,149,329

UNITED STATES PATENT OFFICE 2,149,329

COATED CELLULOSIC FABRIC

Robert W. Ball, Wilmington, Del., assignor, by mesne assignments, to E. I. du Pont de Nemours and Company, a corporation of Delaware No Drawing. Application November 17, 1934, Serial No. 753,474

8 Claims. (Cl. 91—70)

The present invention relates to cellulosic fabrics such as paper, cloth, twine, rope or cord which are coated with a wax, throughout the body of which wax there is dispersed a white pigment of high hiding power and processes of making such fabrics. My invention further relates to the dispersion of the pigment in the wax and to the treatment of the pigment with a dispersing agent.

My novel, coated cellulosic fabrics are distinguished by opacity and resistance to water and other atmospheric influences.

The term "fabric" is used herein in the broad sense of a fabricated article and refers specifically to sheeted and laminated products such as paper, cardboard, etc., to woven products such as burlap, canvas or spun products such as cotton cording, twine, etc. The invention is, however, particularly adapted for the production of white, opaque, water resistant sheeted fabrics such as paper and cardboard coated on one or both sides, when made frob bleached sulfite pulp, unbleached sulfite stock, soda pulp or kraft pulp, such as used for bread wrappers, butcher's wrappings, general household wrapping papers, milk bottle caps, cardboard containers, etc. The invention is also particularly valuable where water resistance, opacity, whiteness, and brightness are desired.

In the past papers have been rendered waterproof by coating them on one or both sides with a clear wax. Such treatment rendered the paper, however, less opaque and reduced its brightness.

To overcome this difficulty it has been proposed to apply to the paper or the cardboard a suspension of a pigment in an aqueous vehicle, such as for instance a casein solution and after drying, to coat the product with a clear wax. This introduces an additional coating and drying operation which is rather expensive.

It has also been proposed to load the paper with a white pigment such as titanium dioxide by incorporating the pigment into the beater, and then coat the loaded paper with a clear wax. This produces a satisfactory white, opaque sheet. It is, however, quite expensive as a large proportion of pigment added in the beater as loading material is not retained by the paper but passes through with the white water where a large proportion of it cannot be recovered economically. The difficulties arise when this procedure is applied to cardboard. In addition the incorporation of large amounts of pigment into the paper stock impairs the physical properties of the paper.

It has also been attempted to coat paper, cardboard, etc. with a mixture of wax and pigment, but all attempts of this nature have failed because of the fact that the inorganic white pigments of high hiding power are not readily wetted by wax and do not disperse therein, to form composition which can readily be applied to paper to form uniform coatings. Coatings as could be made by such previously available wax-pigment mixtures were streaky and contained irregularly distributed lumps of the pigment.

I have found that inorganic white pigments of high hiding power can be dispersed in waxes by means of dispersing agents, forming homogeneous, uniform dispersions which when applied to paper, cardboard or other cellulosic fabrics form uniform coatings of substantial resistance to water, of great opacity and high whiteness and brightness.

One important and essential feature of my invention consists therefore in the dispersion of the pigment in the wax before coating.

This dispersion is effected by the use of a dispersing agent of which a number will be exemplified below.

My invention is applicable particularly to the white, inorganic pigments of high hiding power or high refractive index (for instance 1.89 or higher) which can be exemplified by zinc oxide; zinc sulfid; pigments containing zinc sulfid and an extender such as calcium or barium sulfate, so-called lithopones; titanium dioxide and pigments containing titanium dioxide and an extender such as calcium or barium sulfate, calcium carbonate, etc. or mixtures of such compounds such as titanated lithopones.

Waxes useful in my invention are the same as have heretofore been used without the pigments to coat and waterproof cellulosic fabrics. For cheapness and all around usefulness I prefer to use paraffin in my invention but other mineral, vegetable or synthetic waxes such as bleached ozocerite, carnauba, Opal and Asiatic waxes can likewise be used.

The white inorganic pigments of high hiding power are not easily wetted in such waxes, and it has heretofore been impossible to make wax compositions containing such pigments of a quality which would make them available for coating purposes.

In order to obtain a uniform dispersion of the pigment throughout the body of the wax I incorporate a dispersing agent together with the pigment into the wax.

I can achieve this in various manners. I spray, for instance, an aqueous solution of the dispersing agent upon the dry pigment, then dry the mixture and grind it. This is then ready for incorporation into the molten wax.

I can also add the dispersing agent to an aqueous slurry of the pigment, such as for instance obtained in one of the finishing steps of the manufacture of the pigment, filter, dry and grind the mixture.

I can also add separately the dispersing agent and the pigment to the molten wax and then mechanically work or mix the composition to obtain a thorough dispersion.

I use ordinarily an amount of dispersing agent corresponding to 1% of the weight of the pigment, though amounts as little as ¼% have given satisfactory results and while amounts of more than 1% can be used they are generally unnecessary.

The agents which I found to readily disperse my pigments in waxes are generally weak organic acids, either of the aromatic series such as benzoic acid or they are aliphatic acids of high molecular weight and their salts, such as mixed fatty acids, magnesium soap of mixed fatty acids, naphthenic acids, ocenol acid phthalate, and particularly useful as dispersing agents are sulfonated mineral, vegetable and animal oils such as sulfonated lubricating oils, sulfonated olive oil, sulfonated red oil, sulfonated fish oil and their salts such as the sodium salts. Most of these agents have the property of dispersing inorganic pigments in an aqueous medium and it was quite unexpected that they would have the properties of dispersing the pigments in the nonaqueous waxes.

In one of the preferred embodiments of my invention I use the sodium salt of sulfonated lubricating oil as the dispersing agent for the pigment in the wax.

I have sprayed an aqueous solution of said dispersing agent upon a titanated lithopone (a pigment consisting of titanium dioxide and lithopone) and have dried the mixture, which was then passed through a disintegrator and mixed with paraffin wax by grinding on a roller mill at a temperature above the melting point of the wax. The treated pigment was readily wetted by the wax and dispersed therein to form a smooth paste.

A paste obtained in this manner can then be diluted with additional wax to any desired composition.

Paper and woven or spun products are then coated with this dispersion of pigment by dipping in the molten wax composition and removing the excess coating by passing the paper, etc. between heated squeeze rolls, scrapers or other devices. A smooth, uniform coating of pigment in wax is thus obtained on the cellulosic product, resulting in a bright white, opaque, water resistant product.

Paper or paperboard is coated on one side by passing it over a heated brass roll rotating in a bath of the molten pigment-wax dispersion, and removing the excess coating by passing the coated sheets over a heated scraper or between heated squeeze rolls. A smooth uniform coating of pigment in wax is thus obtained on one side of the sheet resulting in a bright white, waterproof sheet or board.

The following examples are given to illustrate my invention:

Example I 45.4 grams of commercial sodium soap of sulfonated lubricating oil was dissolved in 220 cubic centimeters of water. The resultant solution was sprayed on 4540 grams of a titanated lithopone. The resultant mixture was dried at 110° C. and disintegrated by passing it 4 times through a Kent mill. 600 grams of the above treated titanated lithopone was stirred into 300 grams paraffin wax, melting point 55–57° C., which was at a temperature of approximately 100° C. A smooth uniform paste was obtained. This mixture was passed through a roller mill at a temperature of approximately 90° C., resulting in thorough dispersion of the pigment throughout the wax.

The above mixture was allowed to solidify and was applied as follows:

(1) 300 grams of the 2/1 pigment wax mixture was added to 300 grams paraffin wax, melting point 55–57° C. The whole was heated to 65–70° C., stirred, and 18 lb. (500 x 24" x 36" basis) unpigmented bleached sulphite paper dipped therein and drawn up between brass rolls heated at approximately 90° C. A uniformly coated white waxed paper was thus obtained.

(2) 200 grams of the 2/1 pigment wax mixture was added to 200 grams paraffin wax, melting point 55–57° C. The whole was melted in the bath of a coating machine, stirred and applied at 70 and 100° C. to one side of 22 and 50 lb. papers by a steam heated brass roll rotating in the bath. Excess coating was removed by passing the coated paper over an electrically heated brass scraper. In every case uniform wax-pigment coatings were obtained on the sheets, resulting in papers waxed on one side which were white and bright.

(3) 120 grams of the 2/1 pigment wax mixture was added to 280 grams paraffin wax, melting point 55–57° C. The whole was melted in the bath of a coating machine, stirred and applied at 70 and 100° C. to one side of 22 and 50 lb. papers by a steam heated brass roll rotating in the bath. Excess coating was removed by passing the coated paper over an electrically heated brass scraper. The coatings contained a smaller percentage of pigment than those obtained in application 2 above, but the pigment was distributed uniformly throughout the wax and white bright papers waxed on one side were obtained.

Example II 300 grams paraffin wax, melting point 55–57° C., was heated to 100° C. 6 grams commercial sodium soap of sulfonated lubricating oil was added to the wax, dissolving therein. 600 grams lithopone was stirred into the wax, a smooth uniform paste resulting. This mixture was passed through a roller mill at a temperature of approximately 90° C., resulting in thorough dispersion of the pigment throughout the wax.

The above mixture was allowed to solidify and was applied as follows:

(1) 300 grams of the 2/1 pigment wax was added to 300 grams paraffin wax, melting point 55–57° C. The whole was heated to 65–70° C., stirred, and 18 lb. (500 x 24" x 36" basis) unpigmented bleached sulphite paper dipped therein and drawn up between brass rolls heated at approximately 90° C. A uniformly coated white waxed paper was thus obtained.

(2) 200 grams of the 2/1 pigment wax mixture was added to 200 grams paraffin wax, melting point 55–57° C. The whole was melted in the bath of a coating machine, stirred and applied at 70 and 100 C. to one side of 22 and 50 lb. papers by a steam heated brass roll rotating in the bath. Excess coating was removed by passing the coated paper over an electrically heated brass scraper. In every case uniform wax pigment coatings were obtained on the sheets, resulting in papers waxed on one side which were white and bright.

(3) 120 grams of the 2/1 pigment wax mixture was added to 280 grams paraffin wax, melting point 55-57° C. The whole was melted in the bath of a coating machine, stirred and applied at 70 and 100° C. to one side of 22 and 50 lb. papers by a steam heated brass roll rotating in the bath. Excess coating was removed by passing the coated paper over an electrically heated brass scraper. The coatings contained a smaller percentage of pigment than those obtained in application 2 above, but the pigment was distributed uniformly throughout the wax and white bright papers waxed on one side were obtained.

*Example III*

300 grams paraffin wax, melting point 55-57° C., was heated to 100° C. 6 grams commercial sodium soap of sulfonated lubricating oil was added to the wax, dissolving therein. 600 grams titanated lithopone was stirred into the wax, a smooth uniform paste resulting. This mixture was passed through a roller mill at a temperature of approximately 90° C., resulting in thorough dispersion of the pigment throughout the wax.

The above mixture was allowed to solidify and was applied as follows:

(1) 300 grams of the 2/1 pigment wax mixture was added to 300 grams paraffin wax, melting point 55-57° C. The whole was heated to 65-70° C., stirred, and 18 lb. (500 x 24" x 36" basis) unpigmented bleached sulphite paper dipped therein and drawn up between brass rolls heated at approximately 90° C. A uniformly coated white waxed paper was thus obtained.

(2) 200 grams of the 2/1 pigment wax mixture was added to 200 grams paraffin wax, melting point 55-57° C. The whole was melted in the bath of a coating machine, stirred and applied at 70 and 100° C. to one side of 22 and 50 lb. papers by a steam heated brass roll rotating in the bath. Excess coating was removed by passing the coated paper over an electrically heated brass scraper. In every case uniform wax pigment coatings were obtained on the sheets, resulting in papers waxed on one side which were white and bright.

(3) 120 grams of the 2/1 pigment wax mixture was added to 280 grams paraffin wax, melting point 55-57° C. The whole was melted in the bath of a coating machine, stirred and applied at 70 and 100° C. to one side of 22 and 50 lb. papers by a steam heated brass roll rotating in the bath. Excess coating was removed by passing the coated paper over an electrically heated brass scraper. The coatings contained a smaller percentage of pigment than those obtained in application 2 above, but the pigment was distributed uniformly throughout the wax and white bright papers waxed on one side were obtained.

*Example IV*

300 grams paraffin wax, melting point 55-57° C. was heated to 100° C. 6 grams commercial sodium soap of sulfonated lubricating oil was added to the wax, dissolving therein. 600 grams titanium dioxide was stirred into the wax, a smooth uniform paste resulting. This mixture was passed through a roller mill at a temperature of approximately 90° C., resulting in thorough dispersion of the pigment throughout the wax.

The above mixture was allowed to solidify and was applied as follows:

(1) 300 grams of the 2/1 pigment wax mixture was added to 300 grams paraffin wax, melting point 55-57° C. The whole was heated to 65-70° C., stirred, and 18 lb. (500 x 24" x 36" basis) unpigmented bleached sulphite paper dipped therein and drawn up between brass rolls heated at approximately 90° C. A uniformly coated white waxed paper was thus obtained.

(2) 200 grams of the 2/1 pigment wax mixture was added to 200 grams paraffin wax, melting point 55-57° C. The whole was melted in the bath of a coasting machine, stirred and applied at 70 and 100° C. to one side of 22 and 50 lb. papers by a steam heated brass roll rotating in the bath. Excess coating was removed by passing the coated paper over an electrically heated brass scraper. In every case uniform wax pigment coatings were obtained on the sheets, resulting in papers waxed on one side which were white and bright.

(3) 120 grams of the 2/1 pigment wax mixture was added to 280 grams paraffin wax, melting point 55-57° C. The whole was melted in the bath of a coating machine, stirred and applied at 70 and 100° C. to one side of 22 and 50 lb. papers by a steam heated brass roll rotating in the bath. Excess coating was removed by passing the coated paper over an electrically heated brass scraper. The coatings contained a smaller percentage of pigment than those obtained in application 2 above, but the pigment was distributed uniformly throughout the wax and white bright papers waxed on one side were obtained.

*Example V*

45.4 grams of commercial sodium soap of sulfonated lubricating oil was dissolved in 450 cubic centimeters of water. The resultant solution was stirred into a suspension of 4540 grams of titanated lithopone in 8 liters of water. The resultant mixture was filtered and dried at 110 C. and disintegrated by passing it three times through a Kent mill. 600 grams of the above treated titanated lithopone was stirred into 300 grams paraffin wax, melting point 55-57° C., which was at a temperature of approximately 100° C. A smooth uniform paste was obtained. This mixture was passed through a roller mill at a temperature of approximately 90° C., resulting in thorough dispersion of the pigment throughout the wax.

The above mixture was allowed to solidify and was applied as follows:

(1) 300 grams of the 2/1 pigment wax mixture was added to 300 grams paraffin wax, melting point 55-57° C. The whole was heated to 65-70° C., stirred, and 18 and 44 lb. (500 x 24" x 36" basis) unpigmented papers dipped therein and drawn up between brass rolls heated at approximately 90° C. Uniformly coated white waxed papers were thus obtained.

(2) 200 grams of the 2/1 pigment wax mixture was added to 200 grams paraffin wax, melting point 55-57° C. The whole was melted in the bath of a coating machine, stirred and applied at 70 and 100° C. to one side of 22 and 50 lb. papers by a steam heated brass roll rotating in the bath. Excess coating was removed by passing the coated paper over an electrically heated brass scraper. In every case uniform wax-pigment coatings were obtained on the sheets, resulting in papers waxed on one side which were white and bright.

(3) 120 grams of the 2/1 pigment wax mixture was added to 280 grams paraffin wax, melting point 55–57° C. The whole was melted in the bath of a coating machine, stirred and applied at 70 and 100° C. to one side of 22 and 50 lb. papers by a steam heated brass roll rotating in the bath. Excess coating was removed by passing the coated paper over an electrically heated brass scraper. The coatings contained a smaller percentage of pigment than those obtained in application 2 above, but the pigment was distributed uniformly throughout the wax and white bright papers waxed on one side were obtained.

It will be understood that the above examples are given for illustrative purposes only and that other pigments, other dispersing agents and other waxes can be used to coat other products as explained above.

In these examples the pigment-dispersing agent-wax composition was roller milled to disperse the pigment in the wax. Similar efficient dispersion may also be attained by thorough mechanical stirring or any other convenient means.

The proportion of pigment to wax noted in the above examples may be varied widely without affecting the principle of my invention. The ratio of pigment to wax used in any particular case will be determined by the pigment used, the weight of coating applied and the opacity and brightness desired in the finished product.

It will also be understood that when I speak herein of a pigment-wax dispersion, I limit the expression to such composition where the pigment has been uniformly dispersed throughout the wax by means of a dispersing agent.

I claim:

1. A process for preparing a white, water-resistant, coated cellulosic fabric comprising applying to the surface of said fabric a white, molten, non-aqueous, water-resistant coating composition, comprising a mineral wax, throughout the body of which a white, high hiding power, inorganic pigment from the group consisting of zinc oxide, zinc sulfide, titanium oxide, extended forms or mixtures of such pigments, is dispersed by means of a separately-added dispersing agent, said agent being a weak, organic acidic compound from the group consisting of sulfonated, animal, vegetable and mineral oils and their salts.

2. The process of claim 1, in which said wax is paraffin.

3. The process of claim 1, in which said pigment is titanium dioxide, said wax is paraffin, and said dispersing agent is sulfonated olive oil.

4. The product of claim 1.

5. The product of claim 1, in which said wax is paraffin, said pigment is titanium dioxide, and said dispersing agent is sulfonated olive oil.

6. In a process of preparing an opaque, white, water-resistant wrapping paper, the step of applying to a surface of said wrapping paper a white, molten, water-resistant, non-aqueous composition, comprising a white, inorganic pigment from the group consisting of zinc oxide, zinc sulfide, titanium oxide, extended forms or mixtures of such pigments, dispersed in a mineral wax by means of a separately-added dispersing agent, the latter being a weak, organic, acidic compound from the group consisting of sulfonated animal, vegetable and mineral oils and their salts.

7. The product of claim 6, in which said wax is paraffin, said pigment is titanium dioxide, and said dispersing agent is sulfonated olive oil.

8. The product of claim 6, in which said wax is paraffin, said pigment is zinc sulfide, and said dispersing agent is sulfonated olive oil.

ROBERT W. BALL.